(12) United States Patent
Kaiser et al.

(10) Patent No.: US 8,362,672 B2
(45) Date of Patent: Jan. 29, 2013

(54) ELECTRIC MACHINE

(75) Inventors: Edward L. Kaiser, Orion, MI (US);
Peter Bostwick, Rochester, MI (US);
Kent A. Miller, Pinckney, MI (US);
John A. Diemer, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 262 days.

(21) Appl. No.: 12/796,158

(22) Filed: Jun. 8, 2010

(65) Prior Publication Data
US 2011/0298331 A1 Dec. 8, 2011

(51) Int. Cl.
*H02K 1/18* (2006.01)
*H02K 5/04* (2006.01)

(52) U.S. Cl. ... 310/216.129; 310/216.127; 310/216.131; 310/216.133

(58) Field of Classification Search ........... 310/216.129, 310/216.127, 216.131, 216.133
See application file for complete search history.

(56) References Cited

U.S. PATENT DOCUMENTS

| | | | | |
|---|---|---|---|---|
| 1,551,361 A * | 8/1925 | Ballman | | 310/411 |
| 1,685,054 A * | 9/1928 | Hibbard | | 310/433 |
| 2,460,063 A * | 1/1949 | Cole | | 310/414 |
| 2,499,928 A * | 3/1950 | Misic | | 310/50 |
| 2,506,637 A * | 5/1950 | Fog | | 336/210 |
| 2,530,533 A * | 11/1950 | Moody | | 29/596 |
| 2,650,111 A * | 8/1953 | Kaiser | | 285/47 |
| 2,977,491 A * | 3/1961 | Hueffed et al. | | 310/414 |
| 4,361,953 A * | 12/1982 | Peachee | | 29/596 |
| 4,559,698 A * | 12/1985 | Bair et al. | | 29/598 |
| 4,608,001 A * | 8/1986 | Sugimoto et al. | | 418/55.1 |
| 4,612,734 A * | 9/1986 | Nakajima et al. | | 451/358 |
| 4,859,889 A * | 8/1989 | Andrews et al. | | 310/89 |
| 2002/0094275 A1* | 7/2002 | Bostwick | | 416/175 |
| 2003/0222519 A1* | 12/2003 | Bostwick | | 310/58 |
| 2004/0027011 A1* | 2/2004 | Bostwick et al. | | 310/58 |
| 2005/0208782 A1* | 9/2005 | Reed et al. | | 439/34 |
| 2007/0096584 A1* | 5/2007 | Erfanfar | | 310/216 |
| 2007/0145836 A1* | 6/2007 | Bostwick | | 310/64 |
| 2009/0142208 A1* | 6/2009 | Rhein et al. | | 417/410.3 |

\* cited by examiner

*Primary Examiner* — Quyen Leung
*Assistant Examiner* — Alex W Mok
(74) *Attorney, Agent, or Firm* — Quinn Law Group, PLLC

(57) ABSTRACT

An electric machine having a stator body and a machine housing is provided. The stator body includes a stator ring of generally annular shape and a plurality of stator teeth projecting radially inward. A first bolt hole is defined in either the stator ring or machine housing, and a first receptacle is defined in the other and is coaxial with the first bolt hole. A second bolt hole is defined in either the stator ring or machine housing, and a second receptacle is defined in the other and is coaxial with the second bolt hole. A first counter bore is coaxial with the first receptacle. A first hollow dowel is mated to the first counter bore and the first bolt hole, and defines a first dowel hole, which is coaxial with the first counter bore and the first bolt hole.

13 Claims, 2 Drawing Sheets

ELECTRIC MACHINE

TECHNICAL FIELD

This disclosure relates generally to electrical machines, such as motor/generators.

BACKGROUND

An electric motor uses electric potential energy to produce mechanical energy through the interaction of magnetic fields and current-carrying conductors. The reverse process, using mechanical energy to produce electrical energy, is accomplished by a generator or dynamo. Traction motors used on hybrid, electric, and hybrid-electric vehicles often perform both tasks. Other electric machines, such as motor/generators, combine various features of both motors and generators.

Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

SUMMARY

An electric machine having a stator body and a machine housing is provided. The stator body includes a stator ring of generally annular shape and a plurality of stator teeth projecting radially inward from the stator ring. A first bolt hole is defined in one of the stator ring and the machine housing, and a first receptacle is defined in the other of the stator ring and the machine housing and is coaxial with the first bolt hole. A second bolt hole is defined in one of the stator ring and the machine housing, and a second receptacle is defined in the other of the stator ring and the machine housing and is coaxial with the second bolt hole.

A first counter bore is coaxial with the first receptacle. A first hollow dowel is mated to the first counter bore and the first bolt hole. The first hollow dowel defines a first dowel hole, which is coaxial with the first counter bore and the first bolt hole. The electric machine may be characterized by the absence of a stator housing intermediate the stator body and the machine housing.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1A:
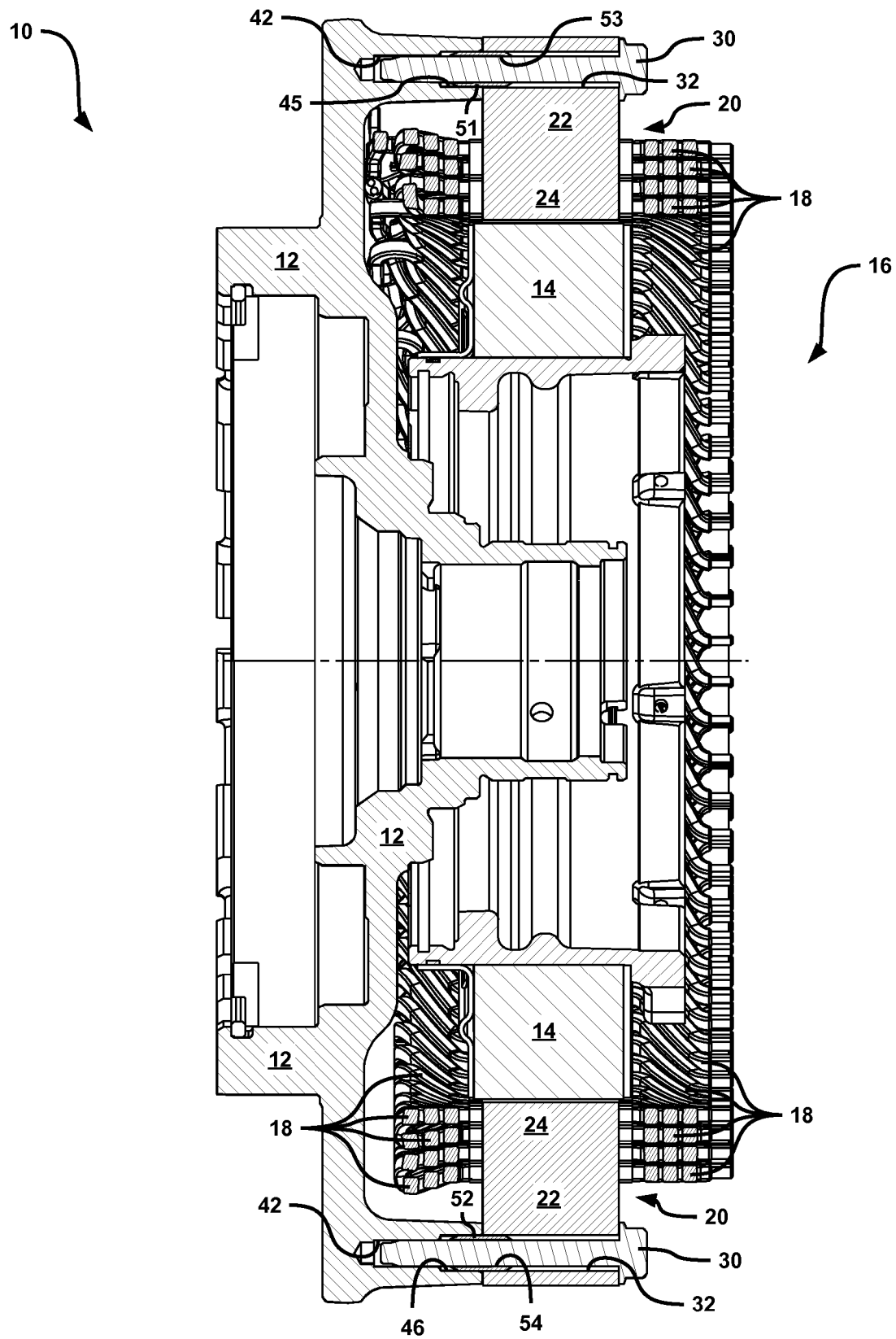
FIG. 1A is a schematic cross-sectional view of a portion of an electric machine having a stator with a solid stator body.
Figure 1B:
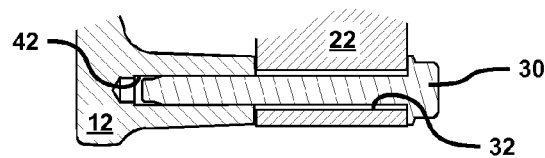
FIG. 1B is a schematic cross-sectional view of a portion of the electric machine shown in FIG. 1A, showing a receptacle without a counter bore.

Referring to the drawings, wherein like reference numbers correspond to like or similar components throughout the several figures, there is shown in FIGS. 1A and 1B a schematic cross-sectional view of an electric machine 10 of the type which may be utilized in a hybrid, electric, or hybrid-electric vehicle. FIG. 1A shows a full cross section of the electric machine 10, while FIG. 1B shows a portion of a cross section rotated approximately ninety degrees from the view shown in FIG. 1A. The electric machine 10 includes, in addition to several other (not shown) components, a machine housing 12 with a rotor 14 and a stator assembly 16 located or disposed generally inside of the machine housing 12. The machine housing 12 may be a housing solely for the electric machine 10 or may be a transmission housing (case) for a transmission (not shown) into which the electric machine is incorporated.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The stator assembly 16 includes windings 18 and a stator body 20. The stator body 20 shown in FIGS. 1A and 1B is a solid body. The stator body 20 includes a generally annular stator ring 22 and a plurality of stator teeth 24 projecting radially inward from the stator ring 22 (many of the stator teeth 24 are not viewable in FIGS. 1A and 1B, but are similar to those shown in FIG. 2). Application of a voltage to the windings 18 causes a torque differential between the stator assembly 16 and the rotor 14.

The windings 18 shown in the figures are made of single-strand wire coils, but may be multi-strand wires or cables. Winding patterns of the stator assembly 16 may include concentrated windings, distributed integral slot windings, fractional slot windings, or other winding patterns known to those having ordinary skill in the art. In concentrated winding patterns, the coil is wound in a concentrated manner on each stator tooth 24. In distributed winding patterns, the coil is wound across a plurality of stator teeth 24, through a plurality of stator slots between the stator teeth 24. Furthermore, any of the winding patterns may use windings 18 with a rectangular cross-section (as shown in FIG. 1A) as the conductor to increase the slot fill in the stator slots, or may use windings 18 with a circular cross-section.

The stator body 20 is attached or mated to the machine housing 12 with a plurality of bolts 30. At least two bolt holes 32 are defined through the stator body 20. The stator body 20 further includes at least four bolt holes 32 defined through the stator body 20. In the stator body 20 shown in FIGS. 1A and 1B, there are four bolt holes 32, with the first and third bolt holes 32 being viewable in FIG. 1A and the second and fourth bolt holes 32 rotated approximately ninety degrees from the first and third bolts 32 as shown in FIG. 1B. The bolt holes 32 may be labeled or identified as first, second, third, or fourth in any order or combination. The first through fourth bolt holes 32 may be defined directly through the stator ring 22 or through corresponding bolt ears or bosses (not shown in FIGS. 1A and 1B, but may be similar to those shown in FIG. 2) extending radially outward from the stator ring 22.

The machine housing 12 includes first, second, third, and fourth receptacles 42 coaxial with respective first through fourth bolt holes 32. As used herein, the term coaxial refers generally to holes or objects having, ideally, the same or overlapping axes. However, due to manufacturing and assembly variations, having the exact same axis may not always occur in the actual components or assemblies. Coaxial may refer to objects or holes that have a slight variation, offset, or angle between the respective axes.

If the stator body 20 includes more or fewer than four bolt holes 32, the machine housing 12 may also include more or fewer than four receptacles 42. The first and third receptacles 42 of machine housing 12 are viewable in FIG. 1A, and the second and fourth receptacles 42 are rotated approximately ninety degrees from the first and third receptacles 42, as viewed in FIG. 1B. The receptacles 42 may be labeled or identified as first, second, third, or fourth in any order or combination.

The machine housing 12 further includes a first counter bore 45 coaxial with the first receptacle 42 and a second counter bore 46 coaxial with the third receptacle 42. The second and fourth receptacles 42, as shown in FIG. 1B, do not include counter bore portions. A first hollow dowel 51 is mated to the first counter bore 45 and the first bolt hole 32, and defines a first dowel hole 53 coaxial with the first counter bore 45 and the first bolt hole 32. A second hollow dowel 52 is mated to the second counter bore 46 and the third bolt hole 32, and defines a second dowel hole 54 coaxial with the second counter bore 46 and the third bolt hole 32.

The bolts 30 pass through the first through fourth bolt holes 32 and engage the first through fourth receptacles 42. The bolts 30 and portions of the first through fourth receptacles 42 may have cooperating threaded portions. Each of the first through fourth bolt holes is substantially identical. However, the bolts 30 passing through the first bolt hole 32 and third bolt hole 32 also pass through the first dowel hole 53 and second dowel hole 54.

The electric machine 10 does not include a stator housing or stator can intermediate the stator body 20 and the machine housing 12. Therefore, loads are transferred from the stator body 20 to the machine housing 12 via either the bolts 30, the first and second hollow dowels 51, 52, or the interface between the stator body 20 and the machine housing 12 (through clamping force generated by the bolts 30).

During assembly of the electric machine 10, the first and second hollow dowels 51, 52 are placed into the first and second counter bores 45, 46. The stator assembly 16 may be completed as a module prior to assembly of the electric machine 10. The first bolt hole 32 and third bolt hole 32 may then be aligned with the first and second hollow dowels 51, 52, respectively.

Aligning the first bolt hole 32 to the first hollow dowel 51 and the third bolt hole 32 to the second hollow dowel 52 orients the stator body 20 relative to the machine housing 12. Therefore, the stator body 20 is located substantially coaxial with the machine housing 12. The bolts 30 may then be inserted and used to attach the stator assembly 16 to the machine housing 12.

In FIG. 1, the bolts 30 are shown attaching the stator assembly 16 to the machine housing 12 such that the bolts 30 pass through the stator body 20 (inserted right to left, as viewed in FIG. 1). However, the electric machine 10 may also be configured such that the bolts 30 attach the machine housing 12 to the stator assembly 16 by threading into receptacles 42 defined in the stator body 20 (inserted left to right, as viewed in FIG. 1). In such a configuration (not shown), the counter bores 45, 46 would be formed in the stator body 20 and the bolt holes 32 would be defined by, and extend through, the machine housing 12. The first and second hollow dowels 51, 52 would be substantially identical and serve substantially-identical functions in either configuration.

Figure 2:
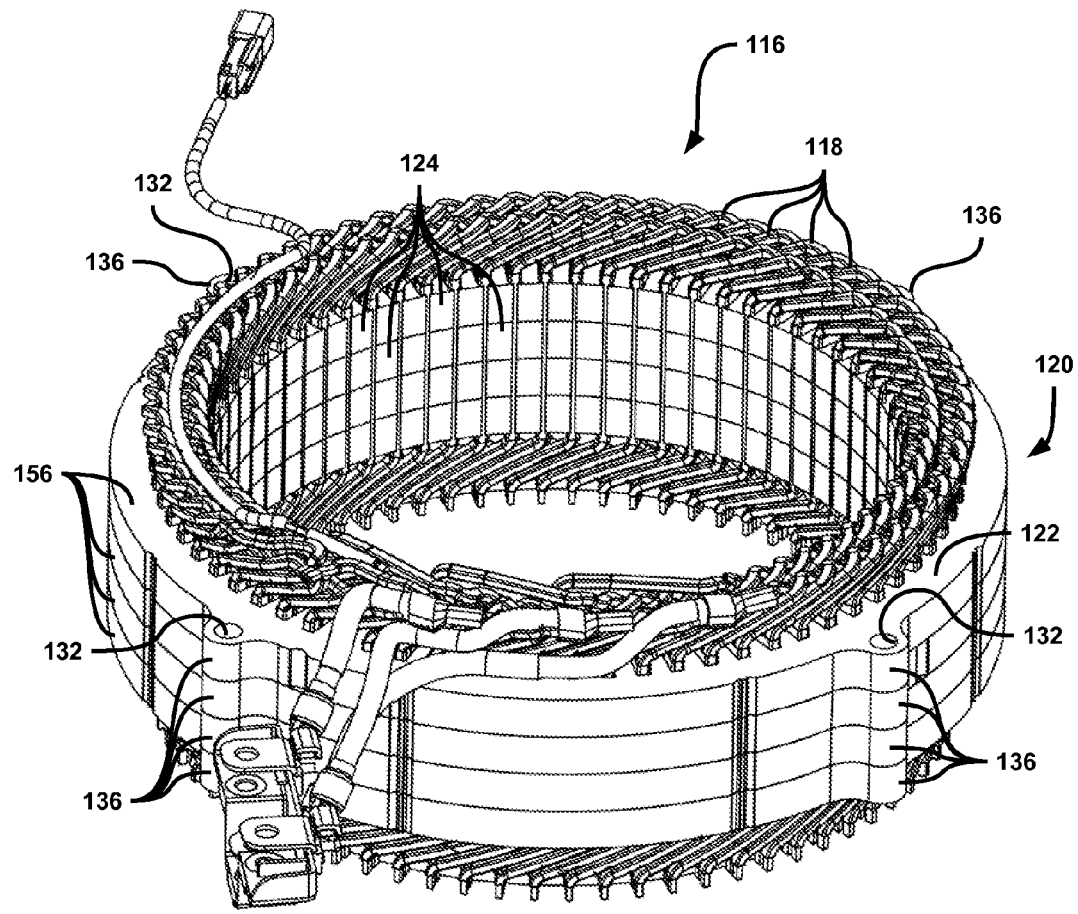
FIG. 2 is a schematic isometric view of a stator for an electric machine, the stator having bolt ears and lamination stacks.

There is shown in FIG. 2 a schematic isometric view of another stator assembly 116 usable with the electric machine 10 and the machine housing 12 shown in FIGS. 1A and 1B, or a similar electric machine and housing. As shown in FIG. 2, the stator assembly 116 includes a stator body 120 having a stator ring 122 and stator teeth 124. Windings 118 are wound through the stator teeth 124.

The stator body 120 also includes first through fourth bolt holes 132 defined therethrough. Like the stator assembly 16 shown in FIGS. 1A and 1B, the stator assembly 116 is configured to be attached to the machine housing 12 without an intermediate stator housing or stator can, and loads are transferred directly between the stator body 120 and the machine housing 12. However, unlike the stator body 20 shown in FIGS. 1A and 1B, the stator body 120 includes first through fourth bolt ears 136 extending radially outward from the stator ring 122. The bolt ears 136 provide bosses through which the bolt holes 132 are defined, and do not require further extending the stator ring 122 to accommodate the bolt holes 132.

Furthermore, unlike the solid stator body 20 shown in FIGS. 1A and 1B, the stator body 120 is formed by a plurality of lamination stacks 156. The lamination stacks 156 are assembled together and cooperate to define the plurality of stator teeth 124, the stator ring 122, the first through fourth bolt holes 132, and the first through fourth bolt ears 136. Because the first through first through fourth bolt holes 132 are substantially identical, the lamination stacks 156 may each be substantially identical and may also be radially symmetric, such that the lamination stacks 156 shown may be rotated ninety-degrees relative to each other without affecting the assembled stator body 120.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electric machine, comprising:
a stator body having a stator ring of generally annular shape and a plurality of stator teeth projecting radially inward from the stator ring;
a machine housing;
a first bolt;
a first bolt hole defined in one of the stator ring and the machine housing, and a first receptacle defined in the other of the stator ring and the machine housing and coaxial with the first bolt hole, wherein the first receptacle is narrower than the first bolt hole and the first receptacle receives a threaded portion of the first bolt;
a second bolt, substantially identical to the first bolt;
a second bolt hole defined in one of the stator ring and the machine housing, and a second receptacle defined in the other of the stator ring and the machine housing and coaxial with the second bolt hole, wherein the second receptacle is narrower than the second bolt hole and the second receptacle receives a threaded portion of the second bolt;
a first counter bore coaxial with the first receptacle and coincident with the first bolt hole; and
a first hollow dowel mated to the first counter bore and the first bolt hole, wherein the first hollow dowel defines a first dowel hole coaxial with the first counter bore and the first bolt hole, such that the first bolt passes entirely through the first hollow dowel and mates to the first receptacle.

2. The electric machine of claim 1, wherein the first bolt hole and first hollow dowel are configured to orient the stator body relative to the machine housing such that the stator body is coaxial with the machine housing.

3. The electric machine of claim 2, wherein the electric machine is characterized by the absence of a stator housing intermediate the stator body and the machine housing.

4. The electric machine of claim 3, wherein the first bolt hole and the second bolt hole are defined in the stator body, wherein the first receptacle, the second receptacle, and the first counter bore are defined in the machine housing, and further comprising:
 a third bolt, substantially identical to the first bolt;
 a fourth bolt, substantially identical to the first bolt;
 wherein the stator body further includes:
  a third bolt hole defined in the stator body, and
  a fourth bolt hole defined in the stator body;
 wherein the machine housing further includes:
  a third receptacle defined in the machine housing and coaxial with the third bolt hole, wherein the third receptacle is narrower than the third bolt hole and the third receptacle receives a threaded portion of the third bolt,
  a fourth receptacle defined in the machine housing and coaxial with the fourth bolt hole, wherein the fourth receptacle is narrower than the fourth bolt hole and the fourth receptacle receives a threaded portion of the fourth bolt, and
  a second counter bore coaxial with the third receptacle and coincident with the second bolt hole; and
 a second hollow dowel mated to the second counter bore and the third bolt hole, wherein the second hollow dowel defines a second dowel hole coaxial with the second counter bore and the third bolt hole, such that the third bolt passes entirely through the second hollow dowel and mates to the third receptacle.

5. The electric machine of claim 4, wherein the third bolt hole and second hollow dowel are configured to orient the stator body relative to the machine housing such that the stator body is coaxial with the machine housing.

6. The electric machine of claim 5, wherein the stator body further includes:
 a first bolt ear defining the first bolt hole;
 a second bolt ear defining the second bolt hole;
 a third bolt ear defining the third bolt hole;
 a fourth bolt ear defining the fourth bolt hole; and
 wherein the first through fourth bolt ears extend radially outward from the stator ring.

7. The electric machine of claim 6, wherein the stator body is formed by a plurality of lamination stacks, such that the plurality of lamination stacks cooperate to define the plurality of stator teeth, the stator ring, and the first through fourth bolt ears.

8. An electric machine, comprising:
 a stator body, including:
  a stator ring having a generally annular shape,
  a plurality of stator teeth projecting radially inward from the stator ring,
  a first bolt ear extending radially outward from the stator ring and defining a first bolt hole, and
  a second bolt ear extending radially outward from the stator ring and defining a second bolt hole;
 a first bolt;
 a second bolt, substantially identical to the first bolt;
 a machine housing including:
  a first receptacle defined in the machine housing and coaxial with the first bolt hole, wherein the first receptacle is narrower than the first bolt hole and the first receptacle receives a threaded portion of the first bolt,
  a second receptacle defined in the machine housing and coaxial with the second bolt hole, wherein the second receptacle is narrower than the second bolt hole and the second receptacle receives a threaded portion of the second bolt, and
  a first counter bore coaxial with the first receptacle and coincident with the first bolt hole, wherein the second receptacle does not include a counter bore coincident with the second bolt hole; and
 a first hollow dowel mated to the first counter bore and the first bolt hole, wherein the first hollow dowel defines a first dowel hole coaxial with the first counter bore and the first bolt hole, such that the first bolt passes entirely through the first hollow dowel and mates to the first receptacle.

9. The electric machine of claim 8, wherein the electric machine is characterized by the absence of a stator housing intermediate the stator body and the machine housing.

10. The electric machine of claim 9, further comprising:
 a third bolt, substantially identical to the first bolt;
 a fourth bolt, substantially identical to the first bolt;
 wherein the stator body further includes:
  a third bolt ear extending radially outward from the stator ring and defining a third bolt hole, and
  a fourth bolt ear extending radially outward from the stator ring and defining a fourth bolt hole;
 wherein the machine housing further includes:
  a third receptacle defined in the machine housing and coaxial with the third bolt hole, wherein the third receptacle is narrower than the third bolt hole and the third receptacle receives a threaded portion of the third bolt,
  a fourth receptacle defined in the machine housing and coaxial with the fourth bolt hole, wherein the fourth receptacle is narrower than the fourth bolt hole and the fourth receptacle receives a threaded portion of the fourth bolt, and
  a second counter bore coaxial with the third receptacle and coincident with the second bolt hole, wherein the fourth receptacle does not include a counter bore coincident with the fourth bolt hole; and
 a second hollow dowel mated to the second counter bore and the third bolt hole, wherein the second hollow dowel defines a second dowel hole coaxial with the second counter bore and the third bolt hole, such that the third bolt passes entirely through the second hollow dowel and mates to the third receptacle.

11. The electric machine of claim 10, wherein the first bolt hole and first hollow dowel and the third bolt hole and second hollow dowel are configured to orient the stator body relative to the machine housing such that the stator body is coaxial with the machine housing.

12. The electric machine of claim 11, wherein the stator body further includes a plurality of lamination stacks, such that the plurality of lamination stacks cooperate to define the plurality of stator teeth, the stator ring, the first through fourth bolt ears, and the first through fourth bolt holes.

13. The electric machine of claim 12, wherein the first through fourth bolt holes are substantially identical.

* * * * *